United States Patent
Watano et al.

(10) Patent No.: US 9,969,321 B2
(45) Date of Patent: May 15, 2018

(54) CONTROL DEVICE OF VEHICLE LAMP DEVICE AND VEHICLE LAMP DEVICE SYSTEM

(71) Applicant: KOITO MANUFACTURING CO., LTD., Tokyo (JP)

(72) Inventors: Yuichi Watano, Shizuoka (JP); Takahisa Nakamura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days. days.

(21) Appl. No.: 15/364,506

(22) Filed: Nov. 30, 2016

(65) Prior Publication Data
US 2017/0151902 A1    Jun. 1, 2017

(30) Foreign Application Priority Data
Dec. 1, 2015    (JP) .................................. 2015-234898

(51) Int. Cl.
*B60Q 1/00*     (2006.01)
*B60Q 1/10*     (2006.01)

(52) U.S. Cl.
CPC .......... *B60Q 1/10* (2013.01); *B60Q 2300/114* (2013.01); *B60Q 2300/132* (2013.01)

(58) Field of Classification Search
CPC .................................. B60Q 1/00; B60Q 1/10
See application file for complete search history.

(56) References Cited

U.S. PATENT DOCUMENTS

| | | | | |
|---|---|---|---|---|
| 5,684,698 A * | 11/1997 | Fujii | .................... | B60G 17/018 180/41 |
| 6,587,042 B2 * | 7/2003 | Tabata | .................... | B62J 27/00 116/28 R |
| 2002/0158754 A1* | 10/2002 | Tabata | .................... | B62J 27/00 340/438 |
| 2012/0101692 A1* | 4/2012 | Kasaba | .................... | B60Q 1/10 701/49 |
| 2012/0268958 A1* | 10/2012 | Kasaba | .................... | B60Q 1/10 362/466 |
| 2012/0294020 A1* | 11/2012 | Kasaba | .................... | B60Q 1/10 362/466 |
| 2014/0156150 A1* | 6/2014 | Kasaba | ................... | B60Q 1/085 701/49 |
| 2017/0151902 A1* | 6/2017 | Watano | .................... | B60Q 1/10 |

FOREIGN PATENT DOCUMENTS

JP    2012-106719 A    6/2012

* cited by examiner

*Primary Examiner* — Yonel Beaulieu
(74) *Attorney, Agent, or Firm* — Sughrue Mion, PLLC

(57) ABSTRACT

A control device of a vehicle lamp device includes a reception unit and a control unit. The control unit includes a timing determination unit configured to determine a driving timing of an actuator configured to change a posture of the vehicle lamp device. The timing determination unit drives the actuator when an acquisition number of the output values of the acceleration sensor reaches a first number while a vehicle speed is less than a predetermined value, and drives the actuator when the acquisition number of the output values of the acceleration sensor reaches a second number smaller than the first number while the vehicle speed is equal to or greater than the predetermined value.

6 Claims, 7 Drawing Sheets

CONTROL DEVICE OF VEHICLE LAMP DEVICE AND VEHICLE LAMP DEVICE SYSTEM

CROSS-REFERENCE TO RELATED APPLICATION

This application claims priority from Japanese Patent Application No. 2015-234898 filed on Dec. 1, 2015, the entire contents of which are incorporated herein by reference.

FIELD

The disclosure relates to a control device of a vehicle lamp device and a vehicle lamp device system, and more particularly, to a vehicle lamp device and a vehicle lamp device system to be used for an automobile and the like.

BACKGROUND

In the related art, auto leveling control of automatically adjusting an optical axis position of a vehicle headlight in accordance with an inclined angle of a vehicle and changing an illumination direction of the headlight has been known. In general, during the auto leveling control, the optical axis position of the headlight is adjusted on the basis of a pitch angle of the vehicle deduced from an output value of a vehicle height sensor. Regarding this, Japanese Patent Application Publication No. 2012-106719A discloses a control device of a vehicle lamp device configured to perform the auto leveling control by using an acceleration sensor.

When the acceleration sensor is used, it is possible to make an auto leveling system at lower cost and lighter, as compared to a configuration where the vehicle height sensor is used.

As a result, it is possible to make the vehicle at low cost and light. In the meantime, even when the acceleration sensor is used, there is always a need to further increase precision of the auto leveling control.

SUMMARY

The disclosure has been made in view of the above situations, and an object of the disclosure is to provide a technology of increasing precision of auto leveling control of a vehicle lamp device.

In order to achieve the above object, an aspect of the disclosure provides a control device of a vehicle lamp device.

The control device includes:
a reception unit configured to receive a signal indicative of an output value of an acceleration sensor; and
a control unit configured to deduce an inclined angle of a vehicle or a change amount of the inclined angle by using the output value of the acceleration sensor to be obtained during vehicle traveling, the control unit configured to control an optical axis angle of the vehicle lamp device.

The control unit includes a timing determination unit configured to determine a driving timing of an actuator configured to change a posture of the vehicle lamp device.

The timing determination unit drives the actuator when an acquisition number of the output values of the acceleration sensor reaches a first number while a vehicle speed is less than a predetermined value, and drives the actuator when the acquisition number of the output values of the acceleration sensor reaches a second number smaller than the first number while the vehicle speed is equal to or greater than the predetermined value.

According to this aspect, it is possible to increase precision of auto leveling control of the vehicle lamp device.

In the above aspect, the acceleration sensor may deduce accelerations of the vehicle in a front-rear direction of the vehicle and in an upper-lower direction of the vehicle.

The control unit may be configured to plot the output values of the acceleration sensor on coordinates in which the acceleration in the front-rear direction of the vehicle is set on a first axis and the acceleration in the upper-lower direction of the vehicle is set on a second axis, and to deduce the inclined angle or the change amount of the inclined angle from a gradient of a line to be obtained from the plotted points.

Also, in the above aspect, a control device of a vehicle lamp device may deduce a summed angle, which is an inclined angle of the vehicle relative to a horizontal surface, including a road surface angle, which is an inclined angle of a road surface relative to the horizontal surface, and a vehicle posture angle, which is an inclined angle of the vehicle relative to the road surface, from the output value of the acceleration sensor.

The control unit may be configured to hold a road surface angle reference value and a vehicle posture angle reference value.

The control unit may be configured to execute first control and second control.

In the first control, the control unit deduces the summed angle by using the output value of the acceleration sensor, outputs an adjusting signal for instructing adjustment of the optical axis angle with respect to a change in the summed angle during vehicle stop, holds the vehicle posture angle, which is to be obtained by including the change amount of the summed angle in the vehicle posture angle reference value, as a new reference value, avoids generation or output of the adjusting signal or outputs a holding signal for holding the optical axis angle with respect to a change in the summed angle during the vehicle traveling, and holds the road surface angle, which is to be obtained by including the change amount of the summed angle in the road surface angle reference value, as a new reference value.

In the second control, the control unit deduces the vehicle posture angle or the change amount of the vehicle posture angle from the gradient of the line, and outputs the adjusting signal by using the deduced vehicle posture angle or deduced change amount of the vehicle posture angle.

Another aspect of the disclosure provides a vehicle lamp device system.

The vehicle lamp device system includes:
a vehicle lamp device capable of adjusting an optical axis;
an acceleration sensor, and
the control device of the vehicle lamp device according to one of the above-described aspects.

According to the disclosure, it is possible to improve the precision of the auto leveling control of the vehicle lamp device.

DETAILED DESCRIPTION

Figure 1:
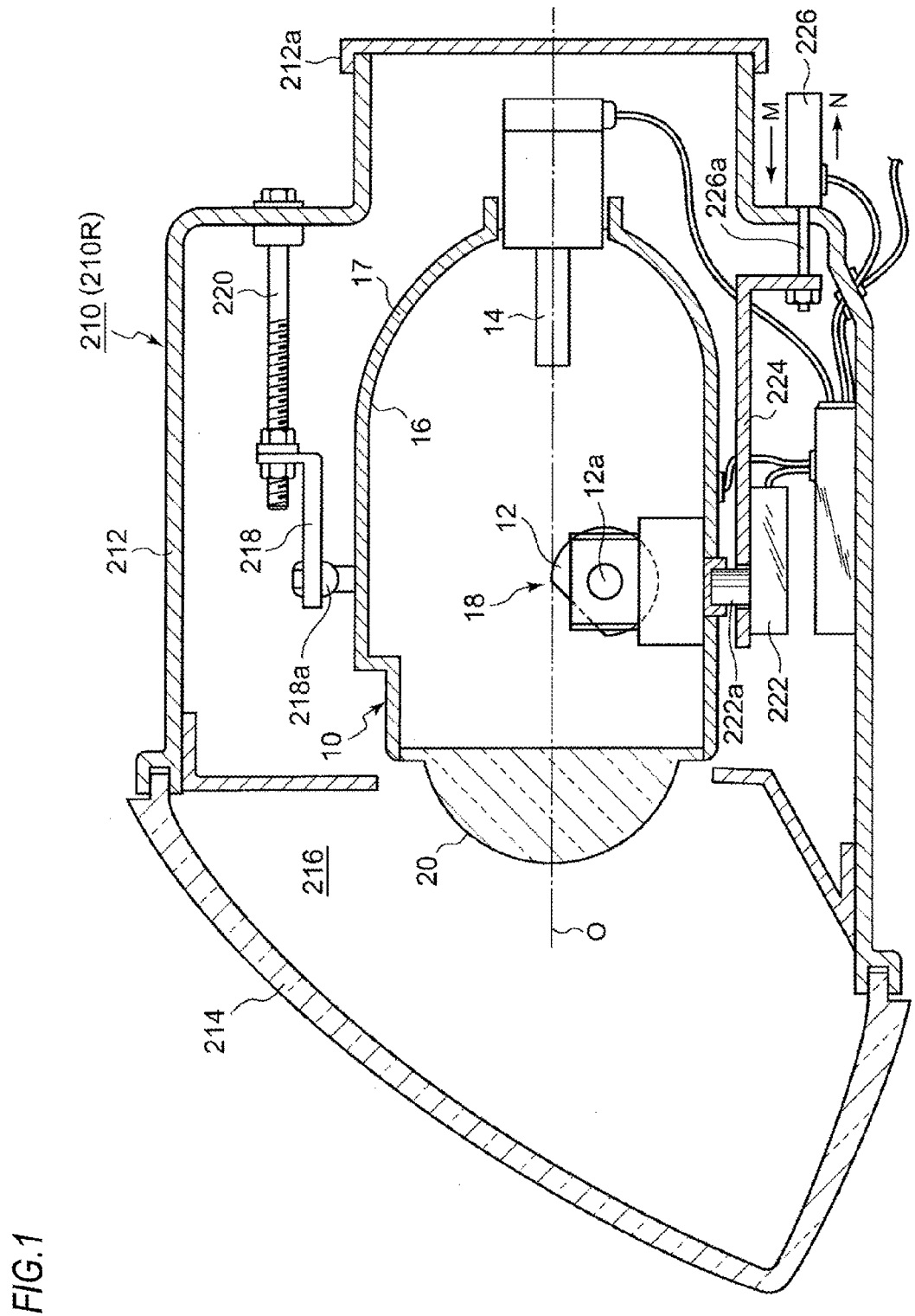
FIG. 1 is a schematic vertically sectional view of a headlight unit including a vehicle lamp device, which is a control target of a control device.

Hereinafter, the disclosure will be described with reference to the drawings, based on a preferred embodiment. The same or equivalent constitutional elements, members and processing shown in the respective drawings are denoted with the same reference numerals, and the overlapping descriptions are appropriately omitted. Also, the embodiment is not construed to limit the disclosure and is just exemplary, and it cannot be said that all features and combinations thereof described in the embodiment are the essentials of the disclosure.

In the specification, the description "during the vehicle traveling" means a time period after an output value of a vehicle speed sensor 312 (which will be described later) exceeds zero (0) until the output value of the vehicle speed sensor 312 becomes zero (0), for example. The description "upon the vehicle stop" means that an output value of an acceleration sensor 110 (which will be described later) becomes stable after the output value of the vehicle speed sensor 312 becomes zero (0), for example. The description "immediately after the start of the vehicle" means predetermined time after the output value of the vehicle speed sensor 312 exceeds zero (0), for example. The description "immediately before the start of the vehicle" means time before predetermined time after the output value of the vehicle speed sensor 312 exceeds zero (0), for example. The description "during the vehicle stop" means a time period after the output value of the acceleration sensor 110 becomes stable until the output value of the vehicle speed sensor 312 exceeds zero (0), for example. The description ". . . becomes stable" means that a change amount per unit time of the output value of the acceleration sensor 110 becomes a predetermined amount or less or means after predetermined time (for example, 1 to 2 seconds) elapses from the time at which the output value of the vehicle speed sensor 312 becomes zero (0), for example. The description "the vehicle 300 is at a stop" means that the vehicle 300 is at a state of "upon the vehicle stop" or "during the vehicle stop". "During the vehicle traveling", "upon the vehicle stop", "immediately after the start of the vehicle", "immediately before the start of the vehicle", "during the vehicle stop", ". . . becomes stable" and "predetermined amount" can be appropriately set on the basis of tests or simulations by a designer.

FIG. 1 is a schematic vertically sectional view of a headlight unit including a vehicle lamp device, which is a control target of a control device in accordance with an embodiment. A headlight unit 210 has such as structure that a pair of headlight units formed symmetrically is respectively arranged left and right sides in a width direction of the vehicle. Since a right headlight unit 210R and a left headlight unit 210L have substantially the same configuration, a structure of the right headlight unit 210R will be described in the below. The headlight unit 210R has a lamp body 212 having an opening at a vehicle front side and a light-transmitting cover 214 configured to cover the opening. The lamp body 212 has a detachable cover 212a at a vehicle rear side. A lamp chamber 216 is formed by the lamp body 212 and the light-transmitting cover 214. In the lamp chamber 216, a lamp device unit 10 serving as the vehicle lamp device is accommodated.

The lamp device unit 10 is provided with a lamp bracket 218 having a pivot mechanism 218a, which is a center of swing in an upper-lower direction of the lamp device unit 10. The lamp bracket 218 is screwed with an aiming adjusting screw 220 supported to the lamp body 212. A rotary shaft 222a of a swivel actuator 222 is fixed to a lower surface of the lamp device unit 10. The swivel actuator 222 is fixed to a unit bracket 224. The unit bracket 224 is connected with a leveling actuator 226. The leveling actuator 226 is configured by a motor configured to advance and retreat a rod 226a in arrow directions M, N, for example, and the like. For example, a DC motor is used as the motor configuring the leveling actuator 226. The lamp device unit 10 is configured so that it becomes at a rearward inclined posture and a forward inclined posture as the rod 226a is advanced and retreated in the arrow directions M, N. Thereby, leveling adjustment of making a pitch angle of an optical axis O face downward and upward can be performed. That is, the leveling actuator 226 corresponds to an actuator configured to change the posture of the lamp device unit 10.

The lamp device unit 10 includes a shade mechanism 18, which includes a rotation shade 12, a light source 14, a lamp device housing 17 configured to support a reflector 16 on an inner wall thereof, and a projection lens 20. An incandescent lamp, a halogen lamp, a discharge lamp, an LED or the like can be used as the light source 14. The reflector 16 has at least partially ellipsoidal shape, and is configured to reflect light emitted from the light source 14. Parts of the light emitted from the light source 14 and the light reflected on the reflector 16 are guided to the projection lens 20 via the rotation shade 12. The rotation shade 12 is a cylindrical member configured to be rotatable about the rotary shaft 12a, and has a notched part and a plurality of shade plates (not shown). The notched part or any one of the shade plates is moved onto the optical axis O, so that a predetermined light distribution pattern is formed. The projection lens 20 is a plane-convex aspheric lens, and is configured to project a light source image, which is to be formed on a rear focal surface, onto a virtual vertical screen in front of the lamp device, as a reverted image. In the meantime, the structure of the lamp device unit 10 is not limited to the above example. For example, a reflection-type lamp device unit having a shutter-type shade or having no projection lens 20 may also be used.

Figure 2:
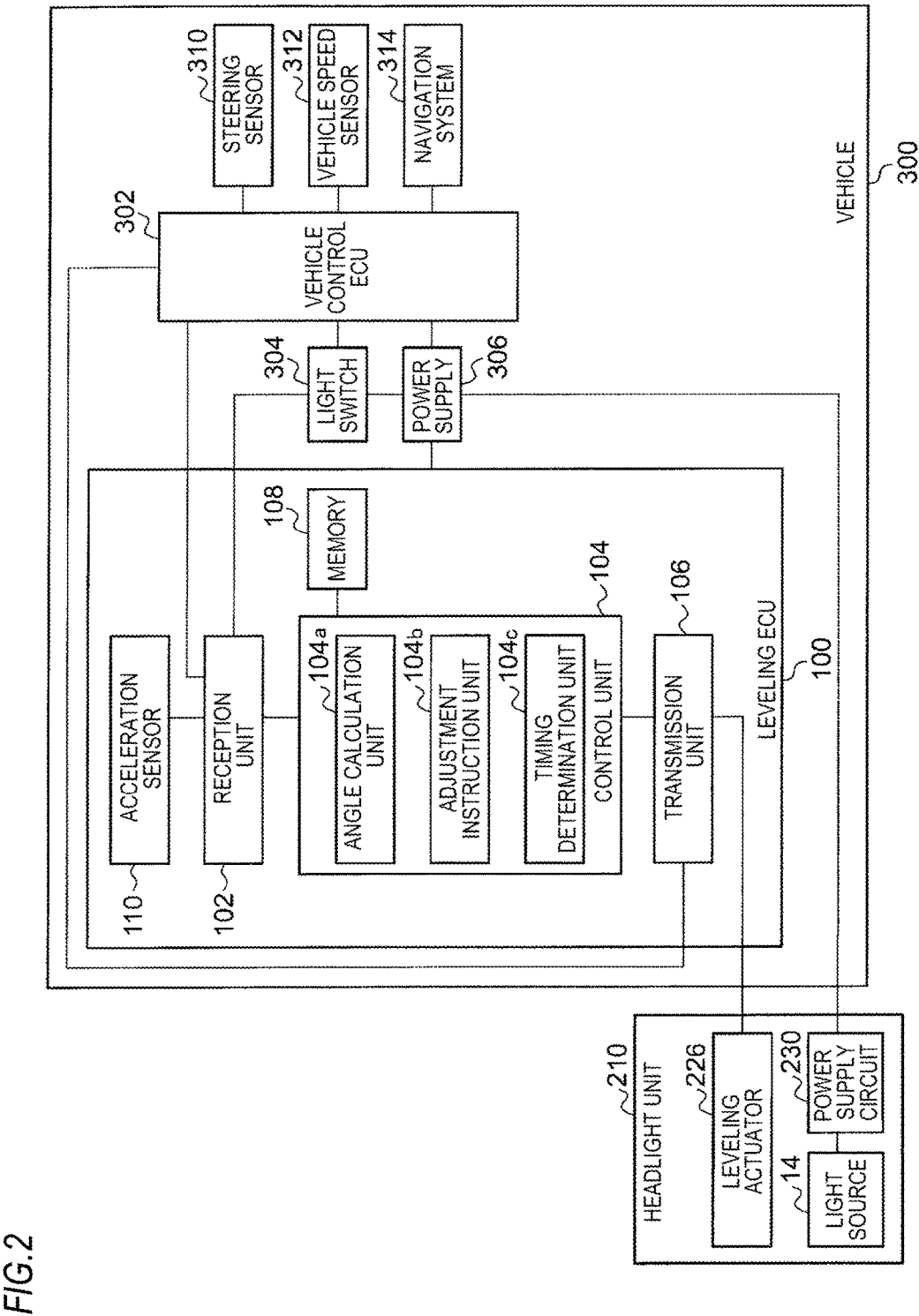
FIG. 2 is a functional block diagram for illustrating operation cooperation of the headlight unit, a vehicle control ECU and a leveling ECU.

FIG. 2 is a functional block diagram for illustrating operation cooperation of the headlight unit, a vehicle control ECU and a leveling ECU. Meanwhile, in FIG. 2, the headlight unit 210R and the headlight unit 210L, are integrated as the headlight unit 210. Also, a leveling ECU 100 and a vehicle control ECU 302 are implemented by a CPU of a computer, an element including a memory, or a circuit, as a hardware configuration, and are implemented by a computer program or the like, as a software configuration.

However, in FIG. 2, the leveling ECU 100 and the vehicle control ECU 302 are shown as functional blocks to be implemented by cooperation of the hardware and software configurations. One skilled in the art can understand that the functional blocks can be implemented in a variety of forms by a combination of the hardware and the software.

The leveling ECU 100 serving as the control device of the vehicle lamp device includes a reception unit 102, a control unit 104, a transmission unit 106, a memory 108 and an acceleration sensor 110. The leveling ECU 100 is provided in the vicinity of a dashboard of the vehicle 300, for example. In the meantime, the provision position of the leveling ECU 100 is not particularly limited and may be provided in the headlight unit 210, for example. Also, the acceleration sensor 110 may be provided outside the leveling ECU 100. The leveling ECU 100 is connected with the vehicle control ECU 302, a light switch 304 and the like. Signals to be output from the vehicle control ECU 302, the light switch 304 and the like are received by the reception unit 102. Also, the reception unit 102 is configured to receive a signal indicative of an output value of the acceleration sensor 110.

The vehicle control ECU 302 is connected with a steering sensor 310, a vehicle speed sensor 312, a navigation system 314 and the like. Signals to be output from these sensors are received by the reception unit 102 of the leveling ECU 100 through the vehicle control ECU 302. The vehicle speed sensor 312 is a sensor configured to calculate a speed of the vehicle 300 on the basis of rotating speeds of wheels, for example. The light switch 304 is configured to transmit a signal for instructing lighting and lights-out of the headlight unit 210, a signal for instructing execution of auto leveling control, and the like to a power supply 306, the vehicle control ECU 302, the leveling ECU 100 and the like in accordance with a user's operation.

The signal received by the reception unit 102 is transmitted to the control unit 104. The control unit 104 is configured to execute the auto leveling control of deducing an inclined angle of the vehicle 300 or a change amount thereof by using the output value of the acceleration sensor 110, and outputting an adjusting signal of a pitch angle (hereinafter, the pitch angle is appropriately referred to as an optical axis angle θo) of the optical axis O of the lamp device unit 10. The control unit 104 has an angle calculation unit 104a, an adjustment instruction unit 104b, and a timing determination unit 104c.

The angle calculation unit 104a is configured to generate pitch angle information of the vehicle 300 by using the output value of the acceleration sensor 110 and, if required, information preserved in a RAM (not shown) of the leveling ECU 100. The adjustment instruction unit 104b is configured to generate an adjusting signal for instructing adjustment of the optical axis angle θo of the lamp device unit 10 by using the pitch angle information generated in the angle calculation unit 104a. The adjustment instruction unit 104b is configured to output the generated adjusting signal to the leveling actuator 226 via the transmission unit 106. The leveling actuator 226 is configured to drive on the basis of the received adjusting signal and the optical axis O of the lamp device unit 10 is thus adjusted with respect to a pitch angle direction. The timing determination unit 104c is configured to determine a driving timing of the leveling actuator 226. The operations of the respective units of the control unit 104 will be described in detail later.

The vehicle 300 is mounted with a power supply 306 configured to feed power to the leveling ECU 100, the vehicle control ECU 302 and the headlight unit 210. When the lighting of the headlight unit 210 is instructed by an operation of the light switch 304, the power is fed from the power supply 306 to the light source 14 via a power supply circuit 230. The power feed from the power supply 306 to the leveling ECU 100 is performed when an ignition switch is on and is stopped when the ignition switch is off.

(Auto Leveling Control)

Figure 3:
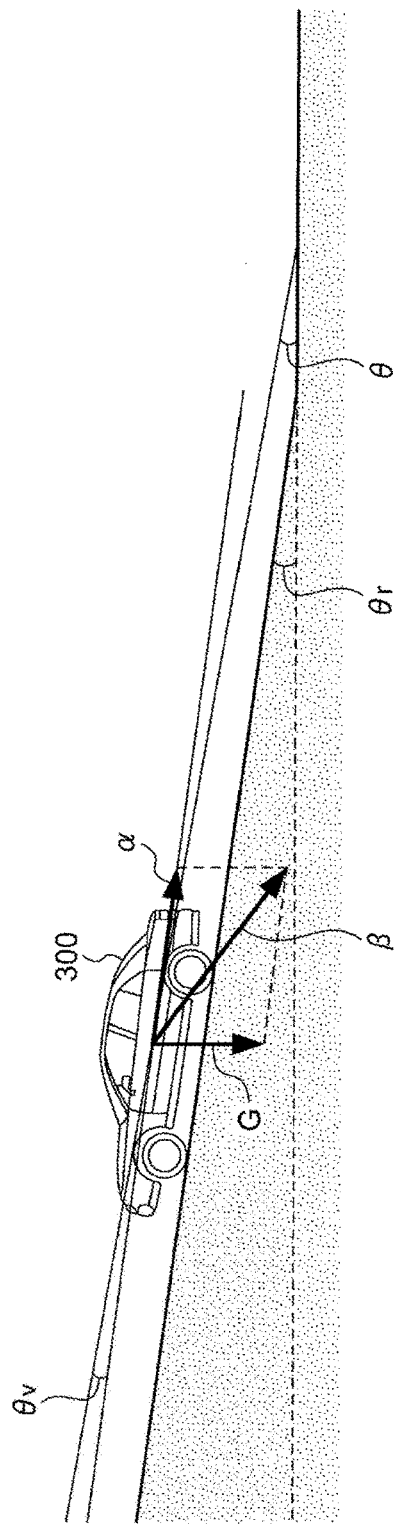
FIG. 3 schematically illustrates an acceleration vector that is to occur in a vehicle and an inclined angle of the vehicle that can be detected by an acceleration sensor.

Subsequently, the auto leveling control that is to be executed by the leveling ECU 100 having the above-described configuration is described. FIG. 3 schematically illustrates an acceleration vector that is to occur in the vehicle and an inclined angle of the vehicle that can be detected by the acceleration sensor.

For example, when luggage is loaded in a trunk of the vehicle or a passenger sits on a rear seat, a vehicle posture becomes a rearward inclined posture, and when the luggage is unloaded from the trunk or when the passenger sitting on the rear seat gets off the vehicle, the vehicle posture is forward inclined from the state of the rearward inclined posture. When the vehicle 300 becomes the rearward inclined posture or the forward inclined posture, an illumination direction of the lamp device unit 10 also varies in the upper-lower direction, so that a forward illumination distance becomes longer or shorter. Therefore, the leveling ECU 100 is configured to set the optical axis angle θo to an angle corresponding to the vehicle posture by deducing an inclined angle in the pitch direction of the vehicle 300 or a change amount thereof from the output value of the acceleration sensor 110. By executing the auto leveling control of performing the leveling adjustment of the lamp device unit 10 in real time on the basis of the vehicle posture, it is possible to optimally adjust a reaching distance of forward illumination light even when the vehicle posture changes.

In the embodiment, the acceleration sensor 110 is a three-axis acceleration sensor having X, Y and Z axes perpendicular to each other. The acceleration sensor 110 is attached to the vehicle 300 at an arbitrary posture and is configured to detect an acceleration vector that is to occur in the vehicle 300. In the vehicle 300 during the traveling, a gravity acceleration and a movement acceleration, which is to occur by movement of the vehicle 300, occur. For this reason, the acceleration sensor 110 can detect a resultant acceleration vector β of a gravity acceleration vector G and a movement acceleration vector α, as shown in FIG. 3. Also, during the stop of the vehicle 300, the acceleration sensor 110 can detect the gravity acceleration vector G. The acceleration sensor 110 is configured to output numerical values of the respective axis components of the detected acceleration vectors.

Since the acceleration sensor 110 is attached to the vehicle 300 at an arbitrary posture, the X, Y and Z axes (axes of the sensor-side) of the acceleration sensor 110 are not always matched with a front-rear axis, a left-right axis and an upper-lower axis (axes of the vehicle-side) of the vehicle 300 determining a posture of the vehicle 300 at a state where the acceleration sensor 110 is mounted to the vehicle 300. For this reason, the control unit 104 is necessarily configured to convert the three-axis components to be output from the acceleration sensor 110, i.e., components of a sensor coordinate system into three-axis components of the vehicle 300, i.e., components of a vehicle coordinate system. In order to calculate the inclined angle of the vehicle 300 by converting the axis components of the acceleration sensor 110 into the axis components of the vehicle 300, reference axis information, which indicates a positional relation among axes of the acceleration sensor 110 attached to the vehicle 300, axes of the vehicle 300 and a road surface angle, is necessary.

Therefore, the control unit 104 is configured to generate the reference axis information, as follows.

First, in a manufacturing factory of a vehicle maker, a maintenance factory of a dealer and the like, the vehicle 300 is put on a road surface (hereinafter, appropriately referred to as a reference road surface) designed to be parallel with a horizontal surface, so that it is at a first reference state. At the first reference state, the vehicle 300 is at a state where one passenger sits on a driver seat. Then, an initialization signal is transmitted by a switch operation of an initialization processing apparatus in the factory, by communication of a CAN (Controller Area Network) system, or the like. When the initialization signal is received, the control unit 104 executes predetermined initialization processing. In the initialization processing, initial aiming adjustment is performed and the optical axis O of the lamp device unit 10 is adjusted to an initial angle. Also, the control unit 104 is configured to associate the positional relation among the coordinate system of the acceleration sensor 110, the coordinate system of the vehicle 300 and the reference road surface (in other words, the horizontal surface) on which the vehicle 300 is positioned.

That is, the control unit 104 is configured to record the output value of the acceleration sensor 110 at the first reference state into a RAM in the control unit 104 or the memory 108, as a first reference vector S1=(X1, Y1, Z1). The memory 108 is a non-volatile memory. Then, the vehicle 300 shifts to a second state where only the pitch angle is different from the first state. For example, it is possible to shift the vehicle 300 to the second state by applying a load to a front part or rear part of the vehicle 300 at the first state. The control unit 104 is configured to record the output value of the acceleration sensor 110 at the second state into the RAM or the memory 108, as a second reference vector S2=(X2, Y2, Z2).

When the first reference vector S1 is acquired, the positional relation between the axes of the acceleration sensor-side and the reference road surface is associated, so that it is possible to perceive a deviation between the Z-axis of the acceleration sensor 110 and the upper-lower axis of the vehicle 300. Also, it is possible to perceive deviations between the front-rear and left-right axes of the vehicle 300 and the X and Y axes of the acceleration sensor 110 from a change of the components of the second reference vector S2 with respect to the first reference vector S1. Thereby, the positional relation between the axes of the acceleration sensor-side and the axes of the vehicle-side is associated, so that the positional relation among the axes of the acceleration sensor-side, the axes of the vehicle-side and the reference road surface is associated. The control unit 104 is configured to record, as the reference axis information, a conversion table, in which numerical values (including numerical values on the reference road surface) of the respective components of the output value of the acceleration sensor 110 are associated with numerical values of the respective axis components of the vehicle 300, into the memory 108.

The angle calculation unit 104a of the control unit 104 is configured to convert the numerical values of the respective components of the X, Y and Z axes to be output from the acceleration sensor 110 into the components of the front-rear axis, the left-right axis and the upper-lower axis of the vehicle 300 by using the conversion table. Therefore, it is possible to deduce the accelerations in the front-rear direction of the vehicle, in the left-right direction of the vehicle and in the upper-lower direction of the vehicle from the output value of the acceleration sensor 110.

Also, it is possible to deduce a gradient of the vehicle 300 relative to the gravity acceleration vector G from the output value of the acceleration sensor 110 during the vehicle stop. That is, it is possible to deduce a summed angle θ, which is an inclined angle of the vehicle 300 relative to the horizontal surface including a road surface angle θr, which is an inclined angle of the road surface relative to the horizontal surface, and a vehicle posture angle θv, which is an inclined angle of the vehicle 300 relative to the road surface, from the output value of the acceleration sensor 110. In the meantime, the road surface angle θr, the vehicle posture angle θv and the summed angle θ are angles of the pitch direction of the vehicle 300.

The auto leveling control is to optimally hold the forward reaching distance of the illumination light by absorbing a change in the forward illumination distance of the vehicle lamp device as the inclined angle in the pitch direction of the vehicle 300 changes. Therefore, the inclined angle of the vehicle 300 necessary for the auto leveling control is the vehicle posture angle θv. That is, in the auto leveling control, when the vehicle posture angle θv changes, the optical axis angle θo of the lamp device unit 10 is adjusted. Thereby, it is expected that when the road surface angle θr changes, the optical axis angle θo of the lamp device unit 10 is held. In order to realize this configuration, it is necessary to extract information about the vehicle posture angle θv from the summed angle θ.

(Basic Control)

Regarding the above, the control unit 104 is configured to execute first control as basic control of the auto leveling. In the first control, a change in the summed angle θ during the vehicle traveling is assumed as a change in the road surface angle θr and a change in the summed angle θ during the vehicle stop is assumed as a change in the vehicle posture angle θv, so that the vehicle posture angle θv is deduced from the summed angle θ. During the vehicle traveling, a case where the vehicle posture angle θv changes due to variations of the loaded luggage or the number of passengers scarcely occurs. Therefore, it is possible to assume a change in the summed angle θ during the vehicle traveling as a change in the road surface angle θr. Also, during the vehicle stop, a case where the road surface angle θr changes due to movement of the vehicle 300 hardly occurs. Therefore, it is possible to assume a change in the summed angle θ during the vehicle stop, as a change in the vehicle posture angle θv.

For example, in the above-described initialization processing, the angle calculation unit 104a of the control unit 104 is configured to convert the output value of the acceleration sensor 110 at the first reference state into the three-axis components of the vehicle 300 by using the generated reference axis information. The control unit 104 is configured to store and hold these values in the RAM, as the reference value (θr=0°) of the road surface angle θr and the reference value (θv=0°) of the vehicle posture angle θv. Also, the control unit is configured to record the reference values in the memory 108, as necessary.

The control unit 104 is configured to deduce the summed angle θ by using the output value of the acceleration sensor 110 and to drive the leveling actuator 226 so as to adjust the optical axis angle θo with respect to the change in the summed angle θ during the vehicle stop. Also, the control unit is configured to include a change amount of the summed angle θ in the reference value of the held vehicle posture angle θv. The control unit is configured to hold the obtained vehicle posture angle θv, as a new reference value. Also, the control unit 104 is configured to avoid the driving of the leveling actuator 226 with respect to the change in the summed angle $\theta$ during the vehicle traveling. Also, the control unit is configured to include the change amount of the summed angle $\theta$ in the reference value of the held road surface angle $\theta r$. The control unit is configured to hold the obtained road surface angle $\theta r$, as a new reference value.

For example, in a situation where the vehicle 300 is actually used, the control unit 104 is configured to avoid generation or output of the adjusting signal for adjusting the optical axis angle $\theta o$ or to output a holding signal for holding the optical axis angle $\theta o$ with respect to the change in the summed angle $\theta$ during the vehicle traveling. Thereby, it is possible to avoid the driving of the leveling actuator 226. The angle calculation unit 104a of the control unit 104 is configured to calculate the current (upon the vehicle stop) summed angle $\theta$ from the output value of the acceleration sensor 110 upon the vehicle stop. Then, the angle calculation unit 104a is configured to obtain the road surface angle $\theta r$ ($\theta r = \theta$−reference value of vehicle posture angle $\theta v$) by subtracting the reference value of the vehicle posture angle $\theta v$ from the current summed angle $\theta$. Then, the angle calculation unit 104a is configured to update the reference value of the road surface angle $\theta r$ held in the RAM by setting the obtained road surface angle $\theta r$ as a new reference value of the road surface angle $\theta r$. A difference between the reference value of the road surface angle $\theta r$ before the update and the reference value of the road surface angle $\theta r$ after the update corresponds to the change amount of the summed angle $\theta$ before and after the vehicle 300 travels. Thereby, the change amount of the summed angle $\theta$ during the vehicle traveling, which is assumed as the change amount of the road surface angle $\theta r$, is included in the reference value of the road surface angle $\theta r$.

Alternatively, the angle calculation unit 104a is configured to calculate a difference $\Delta\theta 1$ of the summed angle $\theta$ (the change amount of the summed angle $\theta$) before and after the traveling, upon the vehicle stop. The angle calculation unit 104a is configured to calculate a new reference value of the road surface angle $\theta r$ (new reference value of road surface angle $\theta r$=reference value of road surface angle $\theta r + \Delta\theta 1$) by including the difference $\Delta\theta 1$ in the reference value of the road surface angle $\theta r$, and to update the reference value of the road surface angle $\theta r$. Thereby, the change amount of the summed angle $\theta$ during the vehicle traveling, which is assumed as the change amount of the road surface angle $\theta r$, is included in the reference value of the road surface angle $\theta r$. The angle calculation unit 104a may be configured to calculate the difference $\Delta\theta 1$, as follows. That is, immediately after the start of the vehicle 300, the angle calculation unit 104a is configured to hold the summed angle $\theta$ immediately before the start of the vehicle 300, as the reference value of the summed angle $\theta$. The angle calculation unit 104a is configured to calculate the difference $\Delta\theta 1$ by subtracting the reference value of the summed angle $\theta$ from the current (upon the vehicle stop) summed angle $\theta$, upon the vehicle stop.

Also, the control unit 104 is configured to generate and output the adjusting signal of the optical axis angle $\theta o$ with respect to the change in the summed angle $\theta$ during the vehicle stop, thereby driving the leveling actuator 226. Specifically, during the vehicle stop, the angle calculation unit 104a is configured to repeatedly calculate the current summed angle $\theta$ from the output value of the acceleration sensor 110 at a predetermined timing. The calculated summed angle $\theta$ is held in the RAM. The angle calculation unit 104a is configured to obtain the vehicle posture angle $\theta v$ ($\theta v = \theta$−reference value of road surface angle $\theta r$) by subtracting the reference value of the road surface angle $\theta r$ from the current summed angle $\theta$. Also, the angle calculation unit 104a is configured to update the reference value of the vehicle posture angle $\theta v$ held in the RAM by setting the obtained vehicle posture angle $\theta v$ as a new reference value of the vehicle posture angle $\theta v$. Thereby, the change amount of the summed angle $\theta$ during the vehicle stop, which is assumed as the change amount of the vehicle posture angle $\theta v$, is included in the reference value of the vehicle posture angle $\theta v$.

Alternatively, the angle calculation unit 104a is configured to calculate a difference $\Delta\theta 2$ (change amount of the summed angle $\theta$) between the current summed angle $\theta$ during the vehicle stop and the held reference value of the summed angle $\theta$. The reference value of the summed angle $\theta$ used at this time is the summed angle $\theta$ obtained upon the calculation of the difference $\Delta\theta 1$, i.e., the summed angle $\theta$ upon the vehicle stop in a case of first calculation of the difference $\Delta\theta 2$ after the vehicle 300 stops, and is the summed angle $\theta$ obtained upon the previous calculation of the difference $\Delta\theta 2$ in a case of second calculation and thereafter. The angle calculation unit 104a is configured to calculate a new reference value of the vehicle posture angle $\theta v$ by including the difference $\Delta\theta 2$ in the reference value of the vehicle posture angle $\theta v$ (new reference value of vehicle posture angle $\theta v$=reference value of vehicle posture angle $\theta v + \Delta\theta 2$), and to update the reference value of the vehicle posture angle $\theta v$. Thereby, the change amount of the summed angle $\theta$ during the vehicle stop, which is assumed as the change amount of the vehicle posture angle $\theta v$, is included in the reference value of the vehicle posture angle $\theta v$.

The adjustment instruction unit 104b is configured to generate the adjusting signal of the optical axis angle $\theta o$ by using the calculated vehicle posture angle $\theta v$ or the new updated reference value of the vehicle posture angle $\theta v$. For example, the adjustment instruction unit 104b is configured to determine the optical axis angle $\theta o$ by using the conversion table in which a value of the vehicle posture angle $\theta v$ and a value of the optical axis angle $\theta o$ recorded in advance in the memory 108 are associated with each other, and to generate the adjusting signal. The adjusting signal is output from the transmission unit 106 to the leveling actuator 226.

(Correction Processing)

As described above, in the first control that is to be executed as the basic control of the auto leveling, the reference value of the vehicle posture angle $\theta v$ or the road surface angle $\theta r$ is subtracted from the summed angle $\theta$, so that the reference value is repeatedly updated. Alternatively, the difference $\Delta\theta 1$ of the change in the summed angle $\theta$ is included in the reference value of the road surface angle $\theta r$ and the difference $\Delta\theta 2$ is included in the reference value of the vehicle posture angle $\theta v$, so that the reference values are repeatedly updated. Thereby, the changes in the road surface angle $\theta r$ and the vehicle posture angle $\theta v$ are included in the respective reference values thereof. In this way, when the reference value of the road surface angle $\theta r$ and the reference value of the vehicle posture angle $\theta v$ are repeatedly re-recorded, a detection error or the like of the acceleration sensor 110 is accumulated in the reference value, so that the precision of the auto leveling control may be lowered. Therefore, the leveling ECU 100 is configured to execute second control (which will be described later), as correction processing of the reference value and the optical axis angle $\theta o$.

Figure 4A:
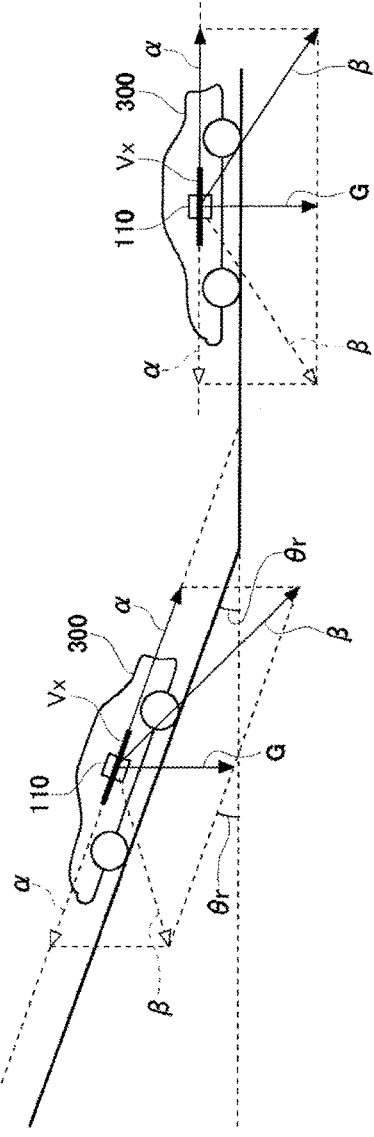
FIGS. 4A and 4B schematically illustrate a relation between a direction of a movement acceleration vector of the vehicle and a vehicle posture angle.
Figure 4B:
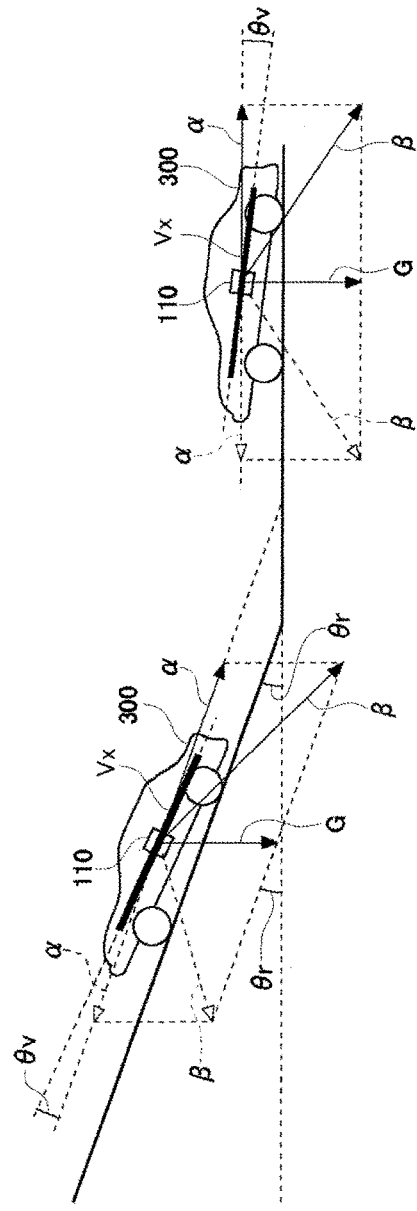
Figure 5:
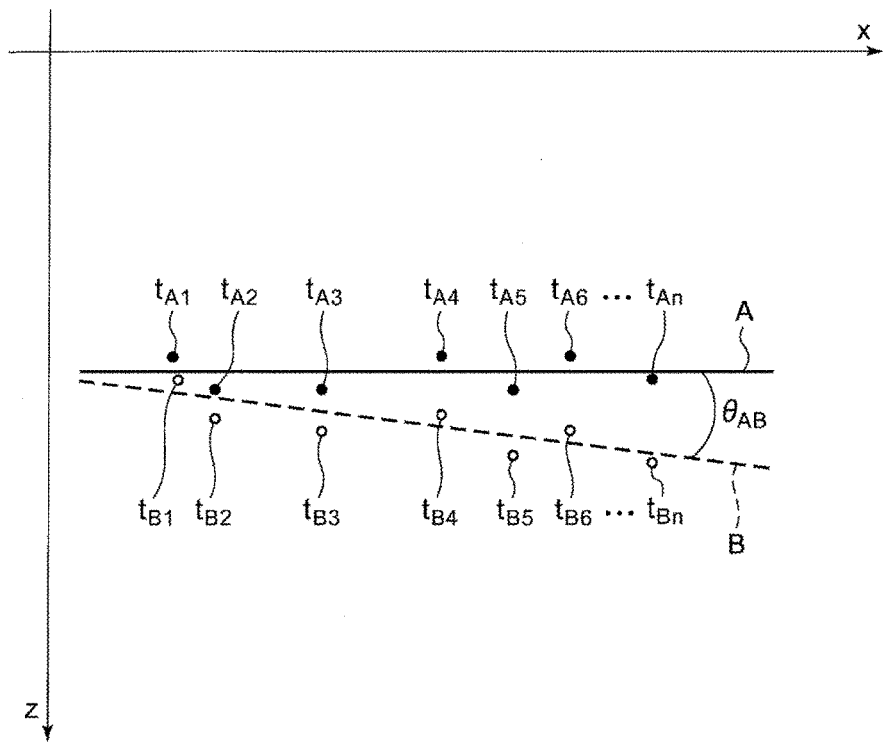
FIG. 5 is a graph depicting a relation between acceleration in a front-rear direction of the vehicle and acceleration in an upper-lower direction of the vehicle.

FIGS. 4A and 4B schematically illustrate a relation between a direction of the movement acceleration vector of the vehicle and the vehicle posture angle. FIG. 4A depicts a state where the vehicle posture angle θv is 0°, and FIG. 4B depicts a state where the vehicle posture angle θv is changed from 0°. Also, in FIGS. 4A and 4B, the movement acceleration vector α and the resultant acceleration vector β, which are to occur when the vehicle 300 advances, are denoted with the solid arrows, and the movement acceleration vector α and the resultant acceleration vector β, which are to occur when the vehicle 300 decelerates or goes backward, are denoted with the dotted arrows. FIG. 5 is a graph depicting a relation between the acceleration in the front-rear direction of the vehicle and the acceleration in the upper-lower direction of the vehicle.

The vehicle 300 moves in parallel with the road surface. Therefore, the movement acceleration vector α becomes a vector parallel with the road surface, irrespective of the vehicle posture angle θv. Also, as shown in FIG. 4A, when the vehicle posture angle θv of the vehicle 300 is 0°, the front-rear axis Vx (or the X-axis of the acceleration sensor 110) of the vehicle 300 is theoretically parallel with the road surface. For this reason, the movement acceleration vector α becomes a vector parallel with the front-rear axis Vx of the vehicle 300. Therefore, when a magnitude of the movement acceleration vector α is changed due to the acceleration or deceleration of the vehicle 300, a trajectory of a tip of the resultant acceleration vector β detected by the acceleration sensor 110 becomes a line parallel with the front-rear axis Vx of the vehicle 300.

On the other hand, as shown in FIG. 4B, when the vehicle posture angle θv is not 0°, the front-rear axis Vx of the vehicle 300 deviates obliquely with respect to the road surface. For this reason, the movement acceleration vector α becomes a vector extending obliquely with respect to the front-rear axis Vx of the vehicle 300. Therefore, when the magnitude of the movement acceleration vector α is changed due to the acceleration or deceleration of the vehicle 300, the trajectory of the tip of the resultant acceleration vector β becomes a line inclined with respect to the front-rear axis Vx of the vehicle 300.

When the output values of the acceleration sensor 110 obtained during the vehicle traveling are plotted on coordinates in which the acceleration in the front-rear direction of the vehicle is set on a first axis (X-axis) and the acceleration in the upper-lower direction of the vehicle is set on a second axis (Z-axis), a result shown in FIG. 5 can be obtained. In FIG. 5, points $t_{A1}$ to $t_{An}$ are the output values at times t1 to tn at the state shown in FIG. 4A. Points $t_{B1}$ to $t_{Bn}$ are the output values at times t1 to tn at the state shown in FIG. 4B. The plot of the output values includes a case where acceleration values of the vehicle coordinate system obtained from the output values of the acceleration sensor 110 are to be plotted, too.

It is possible to estimate the vehicle posture angle θv by deducing a line or vector from at least two points plotted in this way and obtaining a gradient thereof. For example, linear approximation equations A and B are obtained by carrying out the least-square method or moving-average method for the plotted points $t_{A1}$ to $t_{An}$ and $t_{B1}$ to $t_{Bn}$, and gradients of the linear approximation equations A and B are calculated. When the vehicle posture angle θv is 0°, the linear approximation equation A parallel with the X-axis is obtained from the output values of the acceleration sensor 110. That is, the gradient of the linear approximation equation A becomes zero (0). In contrast, when the vehicle posture angle θv is not 0°, the linear approximation equation B having a gradient corresponding to the vehicle posture angle θv is obtained from the output values of the acceleration sensor 110. Therefore, an angle ($θ_{AB}$ in FIG. 5) between the linear approximation equation A and the linear approximation equation B or the gradient of the linear approximation equation B becomes the vehicle posture angle θv. Therefore, it is possible to estimate the vehicle posture angle θv from the gradient of the line or vector obtained by plotting the output values of the acceleration sensor 110 during the vehicle traveling.

Therefore, the angle calculation unit 104a is configured to plot the output values of the acceleration sensor 110 obtained during the vehicle traveling on the coordinates in which the acceleration in the front-rear direction of the vehicle is set on the first axis and the acceleration in the upper-lower direction of the vehicle is set on the second axis. The angle calculation unit 104a is configured to deduce the inclined angle of the vehicle 300, i.e., the vehicle posture angle θv or the change amount thereof by using the gradient of the line or vector obtained from the plotted points. The angle calculation unit 104a is configured to adjust the reference value of the vehicle posture angle θv on the basis of the deduced vehicle posture angle θv or the change amount thereof. Alternatively, the angle calculation unit 104a is configured to hold the deduced vehicle posture angle θv, as a new reference value. Thereby, the reference value of the vehicle posture angle θv is corrected.

For example, when it is detected on the basis of the output value of the vehicle speed sensor 312 that the vehicle 300 is traveling, the angle calculation unit 104a starts the correction processing. In the correction processing, the output value of the acceleration sensor 110 is repeatedly transmitted to the control unit 104 with a predetermined time interval. The output value of the acceleration sensor 110 transmitted to the control unit 104 is held in the RAM or the memory 108.

When the number of the output values reaches a predetermined number necessary to deduce the line or vector one time, the angle calculation unit 104a plots the output values of the acceleration sensor 110 on the above-described coordinates and deduces the line or vector. In the meantime, the angle calculation unit 104a may be configured so that whenever the output value of the acceleration sensor 110 is received, the angle calculation unit 104a plots the output value on the coordinates and when the number of plotted output values reaches the predetermined number, the angle calculation unit 104a deduces the line or vector.

In order to increase the deduction precision of the line or vector, the angle calculation unit 104a is configured to count a plurality of same output values held in the RAM or the memory 108 or a plurality of output values included within a predetermined range in which they are regarded as the same, as one output value. The "predetermined range" can be appropriately set on the basis of tests or simulations carried out by a designer.

The adjustment instruction unit 104b is configured to generate the adjusting signal of the optical axis angle θo by using the deduced vehicle posture angle θv or the change amount thereof or the new updated reference value of the vehicle posture angle θv. The adjusting signal is output from the transmission unit 106 to the leveling actuator 226. Thereby, the optical axis angle θo is corrected. Thereafter, the corrected or updated vehicle posture angle θv is set as the reference value of the vehicle posture angle θv, and the road surface angle θr obtained from the current summed angle θ and the reference value of the vehicle posture angle θv is set as the reference value of the road surface angle θr (thereby, the reference value of the road surface angle θr is corrected), so that the above-described basic control is resumed.

(Control of Driving Timing of Actuator)

In the correction processing, if the leveling actuator 226 is driven whenever the angle calculation unit 104a deduces the vehicle posture angle θr, the number of driving times of the leveling actuator 226 may considerably increase. Therefore, the control unit 104 is configured to control the driving timing of the leveling actuator 226 so as to prolong the lifespan of the leveling actuator 226, as follows.

Figure 6A:
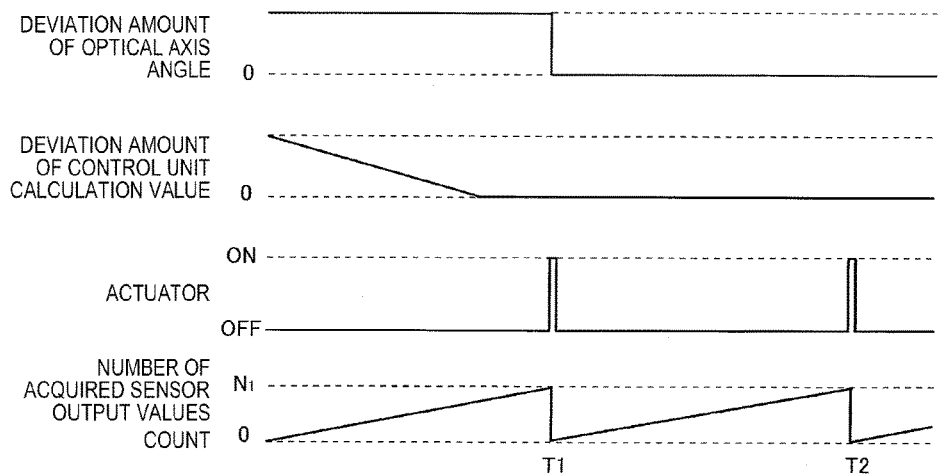
FIGS. 6A and 6B schematically depict changes in a deviation amount of an optical axis angle, a deviation amount of a vehicle posture angle to be calculated by a control unit, a driving state of an actuator and a number of output values of the acceleration sensor to be acquired by the control unit during correction processing.
Figure 6B:
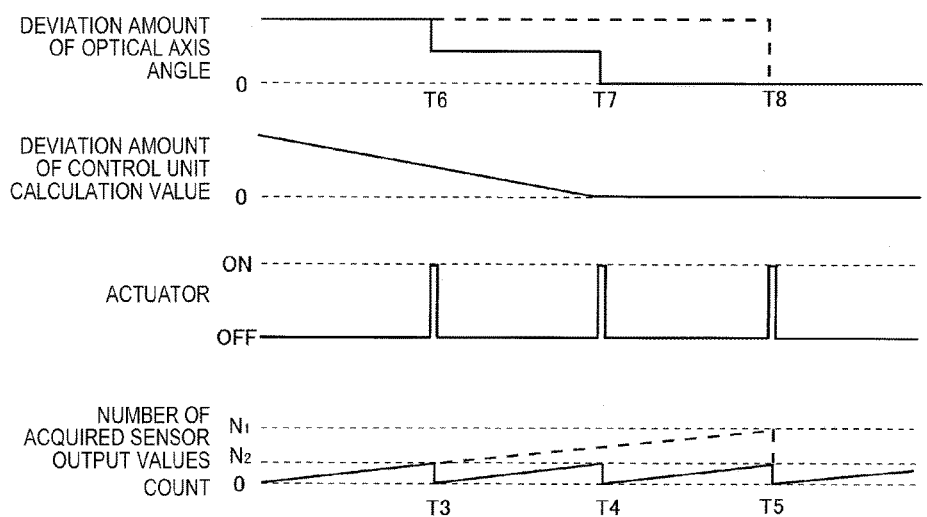

FIGS. 6A and 6B schematically depict changes in a deviation amount of the optical axis angle, a deviation amount of the vehicle posture angle to be calculated by the control unit, a driving state of the actuator and a number of output values of the acceleration sensor to be acquired by the control unit during correction processing. FIG. 6A depicts the changes when the vehicle speed is less than a predetermined value, and FIG. 6B depicts the changes when the vehicle speed is equal to or greater than the predetermined value.

The timing determination unit 104c is configured to count a number of the acquired output values of the acceleration sensor 110 (hereinafter, the output value is appropriately referred to as a sensor output value). Based on the count of the number of acquired sensor output values by the angle calculation unit 104a, the timing determination unit 104c is configured to count a plurality of same sensor output values held in the RAM or the memory 108 or a plurality of sensor output values included within a predetermined range in which they are regarded as the same, as one sensor output value. The timing determination unit 104c is configured to determine the driving timing of the leveling actuator 226, based on the number of acquired sensor output values. The number of acquired sensor output values necessary to drive the leveling actuator 226 is set to a predetermined value greater than the number of acquired output values necessary to deduce the line or vector one time in the correction processing.

When the number of acquired sensor output values reaches the predetermined value, the timing determination unit 104c outputs a signal for instructing the adjustment instruction unit 104b to output the adjusting signal. When the signal is received from the timing determination unit 104c, the adjustment instruction unit 104b outputs the adjusting signal to the leveling actuator 226 through the transmission unit 106. In the meantime, the timing determination unit 104c may be configured to output a signal for instructing the adjustment instruction unit 104b to generate the adjusting signal. When the signal is received from the timing determination unit 104c, the adjustment instruction unit 104b generates the adjusting signal and outputs the same to the leveling actuator 226.

In this way, the timing determination unit 104c is configured to control the output of the adjusting signal on the basis of the number of acquired sensor output values, so that it is possible to suppress the increase in the number of driving times of the leveling actuator 226 in the correction processing. However, for example, in a situation where the speed is stable for a long time such as a case where the vehicle 300 travels on a highway, the number of acquired sensor output values is difficult to increase. In this case, it takes much time until the optical axis angle θo of the lamp device unit 10 is corrected.

Therefore, as shown in FIG. 6A, while the vehicle speed is less than a predetermined value, the timing determination unit 104c drives the leveling actuator 226 when the number of acquired sensor output values reaches a first number $N_1$ (times T1 and T2). The timing determination unit 104c can recognize the vehicle speed from the output value of the vehicle speed sensor 312. When the vehicle speed is less than 80 km/h, for example, the timing determination unit 104c sets, as the first number $N_1$, the number of acquired sensor output values necessary to drive the leveling actuator 226.

On the other hand, as shown in FIG. 6B, while the vehicle speed is equal to or greater than the predetermined value, the timing determination unit 104c drives the leveling actuator 226 when the number of acquired sensor output values reaches a second number $N_2$ (times T3, T4 and T5) smaller than the first number $N_1$.

In FIG. 6B, a change in the deviation amount of the optical axis angle θo and a change in the number of acquired sensor output values when the number of acquired sensor output values becoming a trigger is set to the first number $N_1$ are shown with the dotted lines. Time T5 at which the number of acquired sensor output values reaches the first number $N_1$ when the vehicle speed is equal to or greater than the predetermined value is later than time T1 at which the number of acquired sensor output values reaches the first number $N_1$ when the vehicle speed is less than the predetermined value. For this reason, if the number of acquired sensor output values becoming a driving trigger of the leveling actuator 226 is fixed to the first number $N_1$, when the vehicle speed is equal to or greater than the predetermined value, it takes much time until the correction processing of the optical axis angle θo is executed.

In contrast, according to the embodiment, when the vehicle speed is equal to or greater than the predetermined value, the number of acquired sensor output values becoming a trigger is switched to the second number $N_2$ smaller than the first number $N_1$. Thereby, it is possible to earlier execute the correction processing of the optical axis angle θo. As shown in FIG. 6B, when the number of acquired sensor output values becoming a trigger is the first number $N_1$, the deviation amount of the optical axis angle θo is corrected at time T8. On the other hand, when the number of acquired sensor output values becoming a trigger is the second number $N_2$, the deviation amount of the optical axis angle θo is corrected at time T6 earlier than time T8. Also, at time T7 earlier than time T8, the optical axis angle θo is corrected in the same level as the case where the number of acquired sensor output values becoming a trigger is set to the first number $N_1$. "First number $N_1$", "second number $N_2$," and "predetermined value" for the vehicle speed can be appropriately set on the basis of tests or simulations carried out by a designer.

In the meantime, the timing determination unit 104c is configured to drive the leveling actuator 226 whenever the angle calculation unit 104a deduces the vehicle posture angle θr, in the basic control. The reason is that a possibility that the change in the vehicle posture angle θr will frequently occur during the vehicle stop is low.

Figure 7:
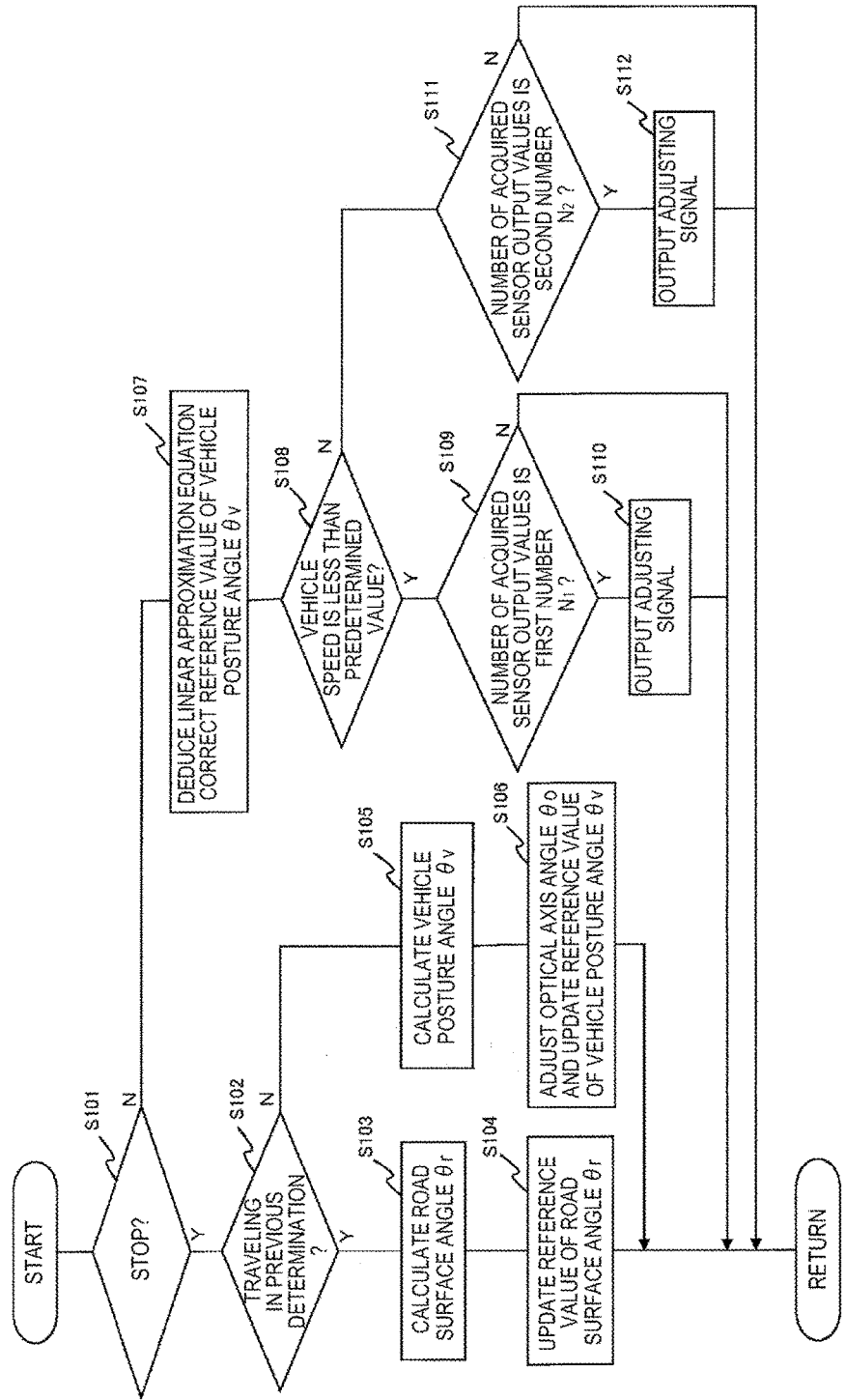
FIG. 7 is a flowchart depicting an example of auto leveling control that is to be executed by the control device of the vehicle lamp device in accordance with an embodiment.

FIG. 7 is a flowchart depicting an example of the auto leveling control that is to be executed by the control device of the vehicle lamp device in accordance with an embodiment. This flow is repeatedly executed at predetermined timings by the control unit 104 when an execution instruction of the auto leveling control is issued by the light switch 304 and the ignition switch becomes on, and is over when the execution instruction of the auto leveling control is released (or a stop instruction is issued) or the ignition switch becomes off.

The control unit 104 determines whether the vehicle 300 is at a stop (S101). When the vehicle 300 is at a stop (Y in S101), the control unit 104 determines whether it has been determined in vehicle stop determination of step S101 of a previous routine whether the vehicle 300 is traveling (N in S101) (S102). When a result of the previous determination is that the vehicle is traveling (Y in S102), it means "upon the vehicle stop", and the control unit 104 calculates the road surface angle θr by subtracting the reference value of the vehicle posture angle θv from the current summed angle θ (S103). Then, the control unit updates the obtained road surface angle θr as a new reference value of the road surface angle θr (S104), and ends the routine.

When a result of the previous determination is that the vehicle is not traveling (N in S102), this means "during the vehicle stop" and the control unit 104 calculates the vehicle posture angle θv by subtracting the reference value of the road surface angle θr from the current summed angle θ (S105). Then, the control unit adjusts the optical axis angle θo by using the obtained vehicle posture angle θv, updates the obtained vehicle posture angle θv as a new reference value (S106), and ends the routine.

When it is determined that the vehicle 300 is not at a stop, i.e., is traveling (N in S101), the control unit 104 executes the correction processing using the output value of the acceleration sensor 110 during the vehicle traveling (S107). In the correction processing, the control unit 104 deduces a linear approximation equation by plotting the output values of the acceleration sensor 110 and estimates the vehicle posture angle By from a gradient of the linear approximation equation. Then, the control unit corrects the reference value of the vehicle posture angle θv by using the estimated vehicle posture angle θv.

Subsequently, the control unit 104 determines whether the vehicle speed is less than the predetermined value (S108). When it is determined that the vehicle speed is less than the predetermined value (Y in S108), the control unit 104 determines whether the number of acquired output values of the acceleration sensor 110 reaches the first number $N_1$ (S109). When it is determined that the number of acquired output values reaches the first number $N_1$ (Y in S109), the control unit 104 outputs the adjusting signal to the leveling actuator 226 (S110), and ends the routine. When it is determined that the number of acquired output values does not reach the first number $N_1$ (N in S109), the control unit 104 ends the routine without outputting the adjusting signal.

When it is determined that the vehicle speed is equal to or greater than the predetermined value (N in S108), the control unit 104 determines whether the number of acquired output values of the acceleration sensor 110 reaches the second number $N_2$ (S111). When it is determined that the number of acquired output values reaches the second number $N_2$ (Y in S111), the control unit 104 outputs the adjusting signal to the leveling actuator 226 (S112), and ends the routine. When it is determined that the number of acquired output values does not reach the second number $N_2$ (N in S111), the control unit 104 ends the routine without outputting the adjusting signal.

As described above, the leveling ECU 100 of the embodiment has the timing determination unit 104c configured to determine the driving timing of the leveling actuator 226 configured to change the posture of the lamp device unit 10. While the vehicle speed is less than the predetermined value, the timing determination unit 104c drives the leveling actuator 226 when the number of acquired output values of the acceleration sensor 110 reaches the first number $N_1$. Also, while the vehicle speed is equal to or greater than the predetermined value, the timing determination unit 104c drives the leveling actuator 226 when the number of acquired sensor output values reaches the second number $N_2$ smaller than the first number $N_1$. Thereby, even when the increase in the number of driving times of the leveling actuator 226 is suppressed, it is possible to suppress the execution time of the correction processing of the optical axis angle θo from being delayed. Therefore, it is possible to increase the precision of the auto leveling control.

The disclosure is not limited to the embodiment, modifications such as diverse design changes based on the knowledge of one skilled in the art can also be made and the modified embodiments are also included within the scope of the disclosure. New embodiments to be made by combinations of the embodiment and the modifications have the respective effects of the combined embodiment and modifications.

In the embodiment, the leveling ECU 100 is configured to execute the optical axis adjustment with respect to the change in the summed angle θ during the vehicle stop, as the auto leveling control, to execute the first control of holding the optical axis angle with respect to the change in the summed angle θ during the vehicle traveling, as the basic control, and to execute the second control of executing the optical axis adjustment by using the gradient of the line or the like deduced from the output value of the acceleration sensor 110 during the traveling, as the correction processing. However, the disclosure is not particularly limited thereto. For example, the leveling ECU 100 may be configured to execute the second control, as the basic control.

In the meantime, the inventions relating to the embodiment may be specified by following items.

[Item 1]

A vehicle lamp device system including:
a vehicle lamp device capable of adjusting an optical axis, an acceleration sensor, and
the control device of the vehicle lamp device.

The invention claimed is:

1. A control device of a vehicle lamp device comprising:
a reception unit configured to receive a signal indicative of an output value of an acceleration sensor; and
a control unit configured to deduce an inclined angle of a vehicle or a change amount of the inclined angle by using the output value of the acceleration sensor to be obtained during vehicle traveling, the control unit configured to control an optical axis angle of the vehicle lamp device,
wherein the control unit includes a timing determination unit configured to determine a driving timing of an actuator configured to change a posture of the vehicle lamp device, and
wherein the timing determination unit drives the actuator when an acquisition number of the output values of the acceleration sensor reaches a first number while a vehicle speed is less than a predetermined value, and drives the actuator when the acquisition number of the output values of the acceleration sensor reaches a second number smaller than the first number while the vehicle speed is equal to or greater than the predetermined value.

2. The control device of a vehicle lamp device according to claim 1,
wherein the acceleration sensor capable of deducing accelerations of the vehicle in a front-rear direction of the vehicle and in an upper-lower direction of the vehicle,
wherein the control unit is configured to plot the output values of the acceleration sensor on coordinates in which the acceleration in the front-rear direction of the vehicle is set on a first axis and the acceleration in the upper-lower direction of the vehicle is set on a second axis, and to deduce the inclined angle or the change amount of the inclined angle from a gradient of a line to be obtained from plotted points.

3. The control device of a vehicle lamp device according to claim 2,
wherein the control device of a vehicle lamp device deduces a summed angle, which is an inclined angle of the vehicle relative to a horizontal surface, including a road surface angle, which is an inclined angle of a road surface relative to the horizontal surface, and a vehicle posture angle, which is an inclined angle of the vehicle relative to the road surface, from the output value of the acceleration sensor,
wherein the control unit is configured to hold a road surface angle reference value and a vehicle posture angle reference value, and to execute first control and second control,
wherein in the first control, the control unit deduces the summed angle by using the output value of the acceleration sensor, outputs an adjusting signal for instructing adjustment of the optical axis angle with respect to a change in the summed angle during vehicle stop, holds the vehicle posture angle, which is to be obtained by including the change amount of the summed angle in the vehicle posture angle reference value, as a new reference value, avoids generation or output of the adjusting signal or outputs a holding signal for holding the optical axis angle with respect to a change in the summed angle during the vehicle traveling, and holds the road surface angle, which is to be obtained by including the change amount of the summed angle in the road surface angle reference value, as a new reference value,
wherein in the second control, the control unit deduces the vehicle posture angle or the change amount of the vehicle posture angle from the gradient of the line, and outputs the adjusting signal by using the deduced vehicle posture angle or deduced change amount of the vehicle posture angle.

4. A vehicle lamp device system comprising:
the control device according to claim 1, wherein the vehicle lamp device has an adjustable optical axis.

5. A vehicle lamp device system comprising:
the control device according to claim 2, wherein the vehicle lamp device has an adjustable optical axis.

6. A vehicle lamp device system comprising:
the control device according to claim 3, wherein the vehicle lamp device has an adjustable optical axis.

* * * * *